(12) United States Patent
Maeda et al.

(10) Patent No.: US 11,760,347 B2
(45) Date of Patent: Sep. 19, 2023

(54) SADDLE RIDE TYPE VEHICLE AND CONTROL APPARATUS

(71) Applicant: HONDA MOTOR CO., LTD., Tokyo (JP)

(72) Inventors: Hiroshi Maeda, Tokyo (JP); Kazuyuki Fukaya, Tokyo (JP); Kineo Tomura, Tokyo (JP); Hiroaki Uchisasai, Tokyo (JP); Takayuki Abe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 234 days.

(21) Appl. No.: 17/189,391

(22) Filed: Mar. 2, 2021

(65) Prior Publication Data
US 2021/0300363 A1  Sep. 30, 2021

(30) Foreign Application Priority Data
Mar. 24, 2020  (JP) ................. 2020-053102

(51) Int. Cl.
*B60W 30/12* (2020.01)
*B62J 45/412* (2020.01)
*B62J 45/415* (2020.01)

(52) U.S. Cl.
CPC ............ *B60W 30/12* (2013.01); *B62J 45/412* (2020.02); *B62J 45/4151* (2020.02)

(58) Field of Classification Search
CPC ............ B60W 30/12; B60W 2300/36; B60W 2554/402; B60W 30/16; B62J 45/412;
(Continued)

(56) References Cited

U.S. PATENT DOCUMENTS 4,670,845 A * 6/1987 Etoh .................. B60K 31/0008
                                                     180/170
10,730,516 B2   8/2020 Ohashi et al.
(Continued)

FOREIGN PATENT DOCUMENTS

DE   102015223012 A1   5/2017
DE   112015003610 T5   5/2017
(Continued)

OTHER PUBLICATIONS

Office Action dated Oct. 22, 2021, issued in counterpart JP application No. 2020-053102, with English partial translation. (3 pages).
(Continued)

*Primary Examiner* — Aniss Chad
*Assistant Examiner* — Nikki Marie M Molina
(74) *Attorney, Agent, or Firm* — WHDA, LLP (57) ABSTRACT

The present invention provides a saddle ride type vehicle including a sensing unit configured to sense a four-wheel vehicle that is present in front of a self-vehicle and is traveling in a travel lane of the self-vehicle, and a control unit configured to, in a case where the four-wheel vehicle is sensed by the sensing unit, perform follow-travel control for causing traveling of the self-vehicle to follow traveling of the four-wheel vehicle, wherein the sensing unit senses a vehicle width of the four-wheel vehicle, and the control unit, in the follow-travel control, controls a travel position in a vehicle width direction of the self-vehicle so that at least a portion of the self-vehicle falls within a region within the vehicle width of the four-wheel vehicle.

8 Claims, 9 Drawing Sheets

(58) Field of Classification Search
CPC ........ B62J 45/4151; B62J 45/41; B62J 45/20; B62D 15/026; B62D 15/025
See application file for complete search history.

(56) References Cited

U.S. PATENT DOCUMENTS

2017/0144665 A1* 5/2017 Ohashi .................... B62J 45/20
2019/0168758 A1* 6/2019 Matsumoto ........... B60W 40/04
2020/0108830 A1  4/2020 Grelaud et al.

FOREIGN PATENT DOCUMENTS

| DE | 102016224913 A1 | 6/2018 | |
|---|---|---|---|
| DE | 102018103698 A1 | 8/2019 | |
| EP | 3335954 A1 | 6/2018 | |
| EP | 3335953 B1 | 11/2019 | |
| EP | 3335955 B1 | 7/2020 | |
| JP | 2009098854 A * | 5/2009 | |
| JP | 2010208465 A * | 9/2010 | .............. B60S 1/485 |
| JP | 2019128744 A * | 8/2019 | |
| JP | 2019-217846 A | 12/2019 | |
| WO | 2017/030130 A1 | 2/2017 | |

OTHER PUBLICATIONS

Office Action and Search Report dated Nov. 24, 2021, issued in counterpart DE Application No. 102021106468.6, with English Translation. (24 pages).

* cited by examiner

FIG. 9

SADDLE RIDE TYPE VEHICLE AND CONTROL APPARATUS

CROSS-REFERENCE TO RELATED APPLICATION(S)

This application claims priority to and the benefit of Japanese Patent Application No. 2020-053102 filed on Mar. 24, 2020, the entire disclosure of which is incorporated herein by reference.

BACKGROUND OF THE INVENTION

Field of the Invention

The present invention relates to a saddle ride type vehicle and a control apparatus.

Description of the Related Art

A so-called lane keeping assist system (LKAS) which is a technology for controlling the steering of a vehicle in the vehicle width direction is proposed in Japanese Patent Laid-Open No. 2019-217846 as a technique for driving support of a vehicle (four-wheel vehicle) as typified by automobiles. In recent years, development and research of technology for applying an LKAS-related technique also to motorcycles (saddle ride type vehicles) has been advancing.

However, there are several problems where improvements should be made in applying techniques related to LKAS to motorcycles. For example, when a motorcycle is traveling following an automobile and is traveling on a road shoulder side of a travel lane, in a case where the travel lane is curved (when at a corner), there are cases where the detection of obstacles such as undulations on a road surface is delayed due to reduced forward visibility. Accordingly, there is a problem with the current state of steering control in the vehicle width direction of a motorcycle when the motorcycle is traveling following an automobile.

SUMMARY OF THE INVENTION

The present invention provides a driving support technique suitable for a saddle ride type vehicle.

According to one aspect of the present invention, there is provided a saddle ride type vehicle including a sensing unit configured to sense a four-wheel vehicle that is present in front of a self-vehicle and is traveling in a travel lane of the self-vehicle, and a control unit configured to, in a case where the four-wheel vehicle is sensed by the sensing unit, perform follow-travel control for causing traveling of the self-vehicle to follow traveling of the four-wheel vehicle, wherein the sensing unit senses a vehicle width of the four-wheel vehicle, and the control unit, in the follow-travel control, controls a travel position in a vehicle width direction of the self-vehicle so that at least a portion of the self-vehicle falls within a region within the vehicle width of the four-wheel vehicle.

Further objects, features and advantages of the present invention will become apparent from the following detailed description of the embodiments of the present invention with reference to the accompanying drawings.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

In each drawing, arrows X, Y, and Z indicate directions perpendicular to each other; the X direction indicates the front-and-rear direction of the saddle ride type vehicle, the Y direction indicates the vehicle width direction (left-and-right direction) of the saddle ride type vehicle, and the Z direction indicates the up-and-down direction (height direction) of the saddle ride type vehicle. The left and right of the saddle ride type vehicle are left and right, respectively, in a case of viewing in the travel direction (moving direction) of the saddle ride type vehicle. Also, there are cases where the front and rear of the front-and-rear direction of the saddle ride type vehicle are simply referred to as the front and rear and cases where the inner side and the outer side in the vehicle width direction of the saddle ride type vehicle are simply referred to as the inner side and the outer side.

Figure 1:
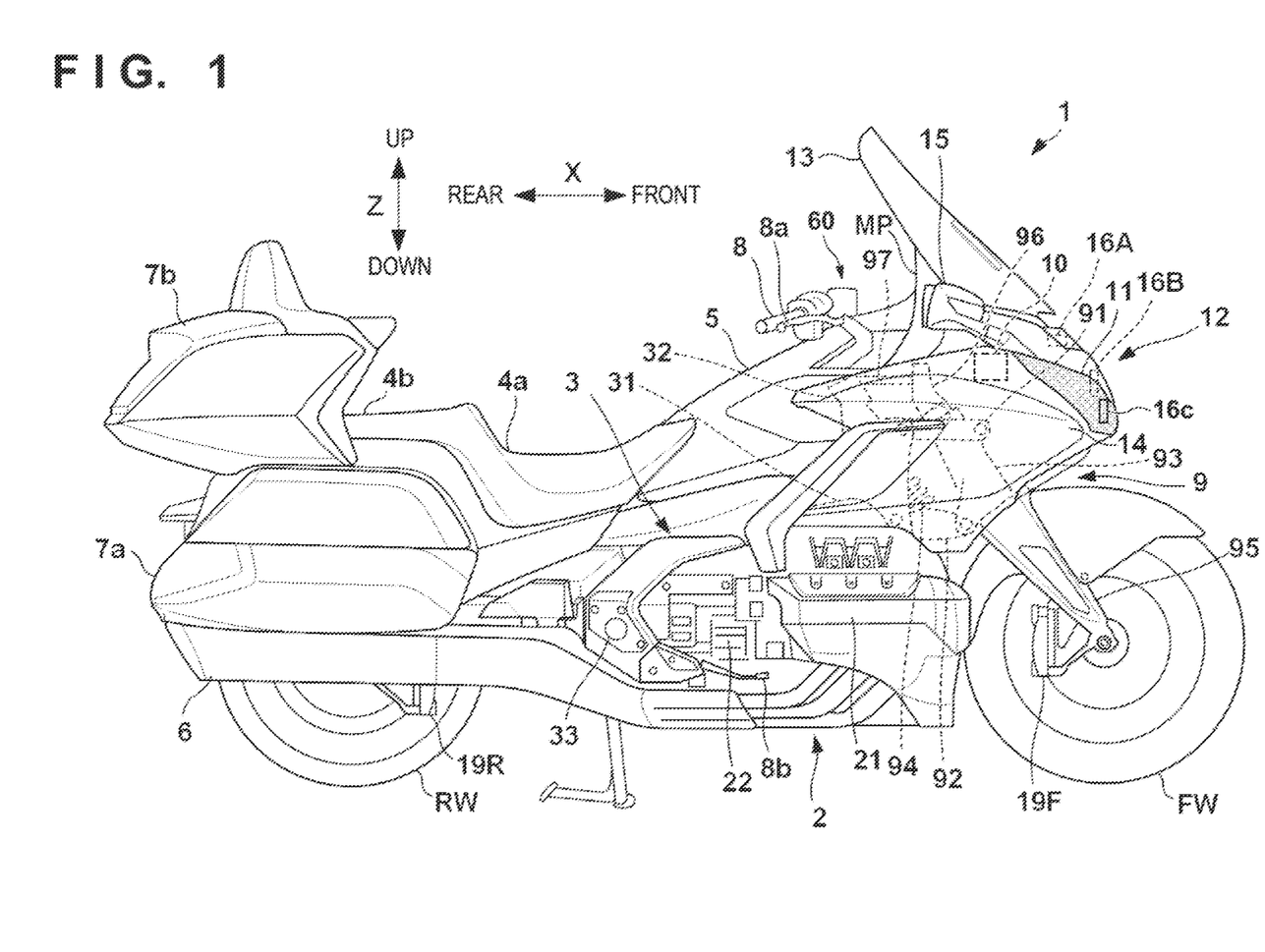
FIG. 1 is a view illustrating a configuration of a saddle ride type vehicle as one aspect of the present invention.
Figure 2:
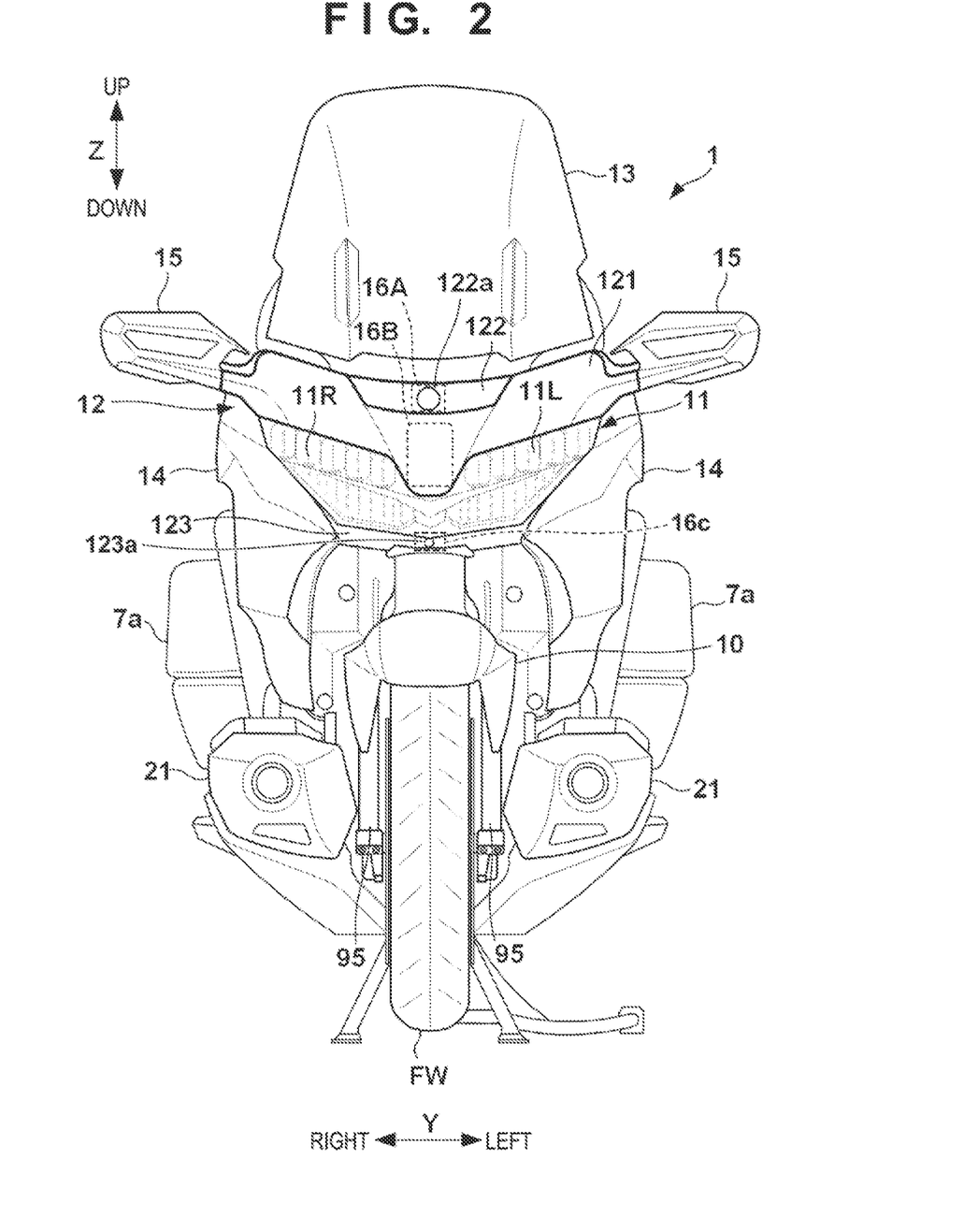
FIG. 2 is a view illustrating a configuration of a saddle ride type vehicle as one aspect of the present invention.

FIG. 1 and FIG. 2 are views illustrating a configuration of a saddle ride type vehicle 1 as one aspect of the present invention, and FIG. 1 is a side view from the right side of the saddle ride type vehicle 1 and FIG. 2 is a front view of the saddle ride type vehicle 1.

The saddle ride type vehicle 1, in the present embodiment, includes a front wheel FW and a rear wheel RW and is a tourer-type motorcycle suitable for traveling long distances. However, the present invention can be applied to various saddle ride type vehicles including other types of motorcycles.

The saddle ride type vehicle 1 includes a power unit 2 between the front wheel FW and the rear wheel RW. The power unit 2, in the present embodiment, is a driving source of an internal combustion engine, and includes an engine 21 and a transmission 22 for changing the speed of the output of the engine 21. Note that that the power unit 2 may use a motor as the driving source. The output (driving force) of the transmission 22 is delivered to the rear wheel RW via a drive shaft.

The power unit 2 is supported by a vehicle body frame 3. The vehicle body frame 3 includes a pair of left and right main frames 31 arranged to extend in the front-and-rear direction. A fuel tank 5 and such is positioned in the upper part of the main frames 31. A meter panel MP including a display apparatus for displaying various information in relation to a driver is provided in the front of the fuel tank 5.

A head pipe 32 for supporting a steering shaft to be pivoted by a handle 8 so as to be pivotable is provided in the front end portion of the main frames 31. A pair of left and right pivot plates 33 is provided in the rear end portions of the main frames 31. The lower end portion of the pivot plates 33 and the front end portion of the main frames 31 are connected via a pair of left and right lower arms, and the power unit 2 is supported by the main frames 31 and the lower arms. A pair of left and right seat rails extending in the rear direction is provided in the rear end portion of the main frames 31. The seat rails support a seat 4a on which the driver sits, a seat 4b on which a passenger sits, a rear trunk 7b, and the like.

The front end portion of a rear swing arm extending in the front-and-rear direction is supported on the pivot plates 33 so as to be swingable. The rear swing arm is configured to be swingable in the up-and-down direction. A rear wheel RW is supported at the rear end portion of the rear swing arm. An exhaust muffler 6 for muting the exhaust of the engine 21 is arranged to extend in the front-and-rear direction on the lower side of the rear wheel RW. Left and right saddlebags 7a are provided on the upper side of the rear wheel RW.

A front suspension mechanism 9 for supporting the front wheel FW is provided in the front end portion of the main frames 31. The front suspension mechanism 9 includes an upper link 91, a lower link 92, a fork support member 93, a cushion unit 94, and a pair of left and right front forks 95.

The upper link 91 and the lower link 92 are positioned at the front end portion of the main frames 31 having a space at the top and bottom, respectively. The rear end portion of each of the upper link 91 and the lower link 92 is connected to a supporting portion provided in the front end portion of the main frames 31 so as to be swingable. Also, the front end portion of each of the upper link 91 and the lower link 92 is connected to the fork support member 93 so as to be swingable. The upper link 91 and the lower link 92 respectively extend in the front-and-rear direction and, in effect, are positioned in parallel.

The cushion unit 94 has a structure in which a shock absorber is inserted into a coil spring. The upper end portion of the cushion unit 94 is supported by the main frames 31 so as to be swingable. The lower end portion of the cushion unit 94 is supported by the lower link 92 so as to be swingable.

The fork support member 93 has a cylindrical shape and tilts backward. The front end portion of the upper link 91 is connected to the upper front portion of the fork support member 93 so as to be pivotable. The front end portion of the lower link 92 is connected to the lower rear portion of the fork support member 93 so as to be pivotable.

A steering shaft 96 is supported by the fork support member 93 so as to be pivotable around its axis. The steering shaft 96 includes a shaft portion to be inserted into the fork support member 93. A bridge BG is provided on the lower end portion of the steering shaft 96. The pair of left and right front forks 95 is supported by the bridge BG. The front wheel FW is supported by the front forks 95 so as to be pivotable. The upper end portion of the steering shaft 96 is connected to the steering shaft to be pivoted by the handle 8 via a link 97. The steering shaft 96 is rotated by the steering of the handle 8, to thereby steer the front wheel FW.

Figure 3:
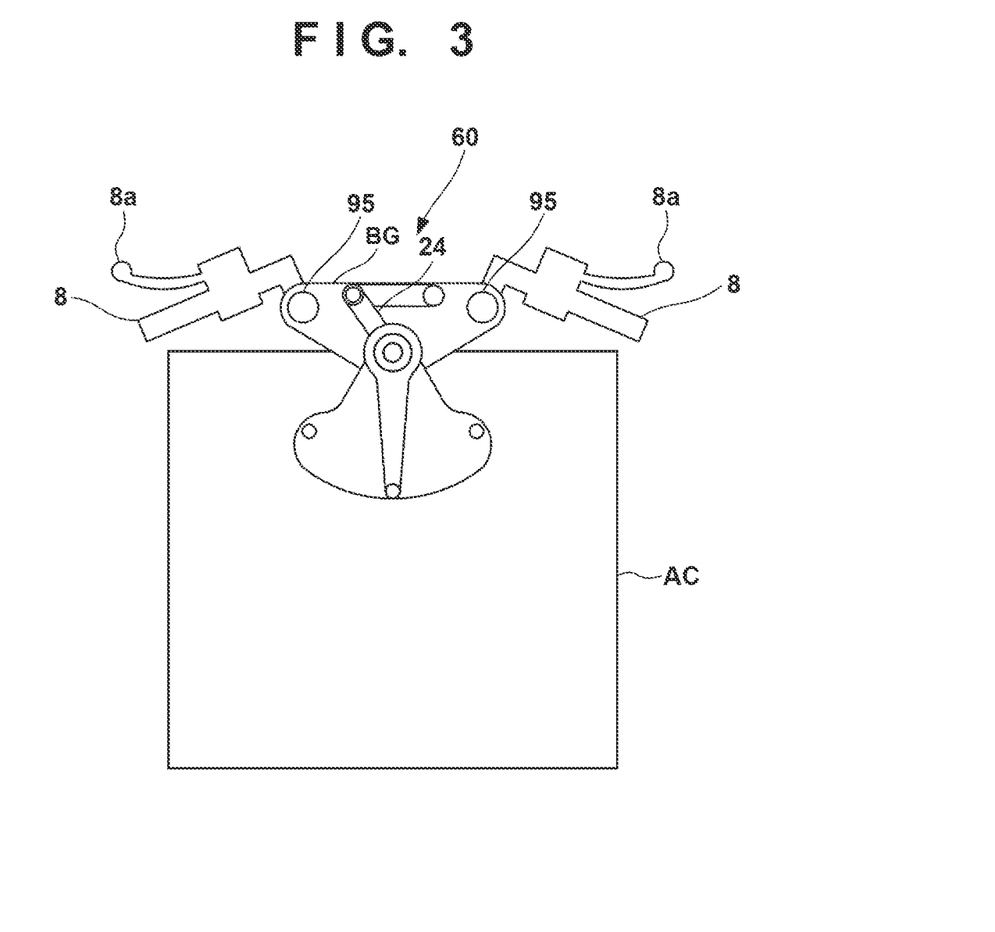
FIG. 3 is a view illustrating a configuration of a steering mechanism.

Each of the units described above related to the steering of the front wheel FW configures a steering mechanism 60 for steering the front wheel FW as illustrated in FIG. 1 and FIG. 3. FIG. 3 is a view illustrating a configuration of the steering mechanism 60. Note that in FIG. 3, only the handle 8, the front forks 95, and the bridge BG which are a portion of the steering mechanism 60 are illustrated. Also, in the present embodiment, as a technique for driving support related to the driver, a mechanism for automatically steering the front wheel FW via the steering mechanism 60, specifically, an actuator AC for applying a driving force for operating the handle 8 to the steering mechanism 60 instead of the driver is provided in relation to the steering mechanism 60. However, for the mechanism for automatically steering the front wheel FW, any technique known in the field can be applied.

The saddle ride type vehicle 1 includes a braking device 19F for braking on the front wheel FW and a braking device 19R for braking on the rear wheel RW. The braking devices 19F and 19R are configured to be operable by the operation of the driver related to a brake lever 8a or a brake pedal 8b. The braking devices 19F and 19R include a disc brake, for example. Also, in the present embodiment, as a technique for driving support related to the driver, an automatic braking mechanism for automatically operating the braking devices 19F and 19R in place of the driver is provided. For the automatic braking mechanism, any technique known in the field can be applied.

A headlight unit 11 for radiating light ahead of the saddle ride type vehicle 1 is provided in the front portion of the straddle type vehicle 1. The headlight unit 11 is configured, as illustrated in FIG. 2, by a two-lamp headlight unit in which a light emitting portion 11R and the light emitting portion 11L are positioned in bilateral symmetry. However, a one-lamp or three-lamp headlight unit or a bilaterally asymmetrical two-lamp headlight unit can be employed for the headlight unit 11.

The front portion of the saddle ride type vehicle 1 is covered by a front cowl 12, and the sides of the front of the straddle type vehicle 1 are covered by a pair of left and right side cowls 14. A screen 13 is positioned on the upper part of the front cowl 12. The screen 13 functions as a windshield for reducing wind pressure received by the driver while traveling and is configured by a transparent resin member, for example.

A pair of left and right side mirror units 15 is provided at the sides of the front cowl 12. A side mirror for the driver to see behind is supported by the side mirror units 15.

The front cowl 12, in the present embodiment, includes cowl members 121, 122, and 123. The cowl member 121 extends in the left-and-right direction and configures the main body of the front cowl 12, and the cowl member 122 configures the upper portion of the cowl member 121. The cowl member 123 is disposed apart in the downward direction from the cowl member 121.

An opening for exposing the headlight unit 11 is formed between the cowl member 121 and the cowl member 123 and between the pair of left and right side cowls 14. The upper edge of the corresponding opening is defined by the cowl member 121, the lower edge of the corresponding opening is defined by the cowl member 123, and the left and right side edges of the corresponding opening is defined by the side cowls 14.

Behind the front cowl 12, an image capturing unit 16A, a radar 16B, and a measurement device 16C are provided as sensing devices for sensing a situation in front of the saddle ride type vehicle 1. The image capturing unit 16A and the radar 16B, in the present embodiment, are present at the front of the saddle ride type vehicle 1, in other words the self-vehicle, and functions as sensing devices for sensing a vehicle, especially a four-wheel vehicle, traveling in the travel lane of the self-vehicle.

The image capturing unit 16A includes a capturing sensor such as a CCD image sensor and a CMOS image sensor and an optical system such as a lens and acquires images by capturing ahead of the saddle ride type vehicle 1. The image capturing unit 16A is positioned behind the cowl member 122 configuring the upper portion of the front cowl 12. An opening 122a penetrating the cowl member 122 is formed on the cowl member 122. The image capturing unit 16A captures ahead of the saddle ride type vehicle 1 via the opening 122a and then acquires images.

The radar 16B includes a millimeter-wave radar, for example. The radar 16B is provided behind the cowl member 121. Accordingly, the cowl member 121 is configured by a material such as resin which can transmit electromagnetic waves. By the existence of the cowl member 121, it is possible to make the existence of the radar 16B (sensing unit) inconspicuous in the front view of the saddle ride type vehicle 1 and avoid spoiling the appearance of the saddle ride type vehicle 1.

The measurement device 16C includes a wind velocity sensor and a wind amount sensor and measures the pressure of wind that the saddle ride type vehicle 1 (self-vehicle) receives while traveling. The measurement device 16C is positioned behind the cowl member 123 configuring the lower portion of the front cowl 12. An opening 123a penetrating the cowl member 123 is formed on the cowl member 123. The measurement device 16C, via the opening 123a, measures the pressure of wind that the saddle ride type vehicle 1 receives while traveling.

The image capturing unit 16A, the radar 16B, and the measurement device 16C are provided at the center in the left-and-right direction of the front cowl 12 in the front view of the vehicle. By providing the image capturing unit 16A, the radar 16B, and the measurement device 16C at the center in the left-and-right direction of the saddle ride type vehicle 1, it becomes possible to obtain a wider image capturing range, sensing range, and measuring range to the left and right in front of the saddle ride type vehicle 1 as well as detect the situation in front of the saddle ride type vehicle 1 with less overlooking of things. Also, it becomes possible to monitor in front of the straddle type vehicle 1 equally to the left and right by one image capturing unit 16A, one radar 16B, and one measurement device 16C. Accordingly, it is especially advantageous in a configuration in which not a plurality but one of each of the image capturing unit 16A, the radar 16B, and the measurement device 16C is provided.

Figure 4:
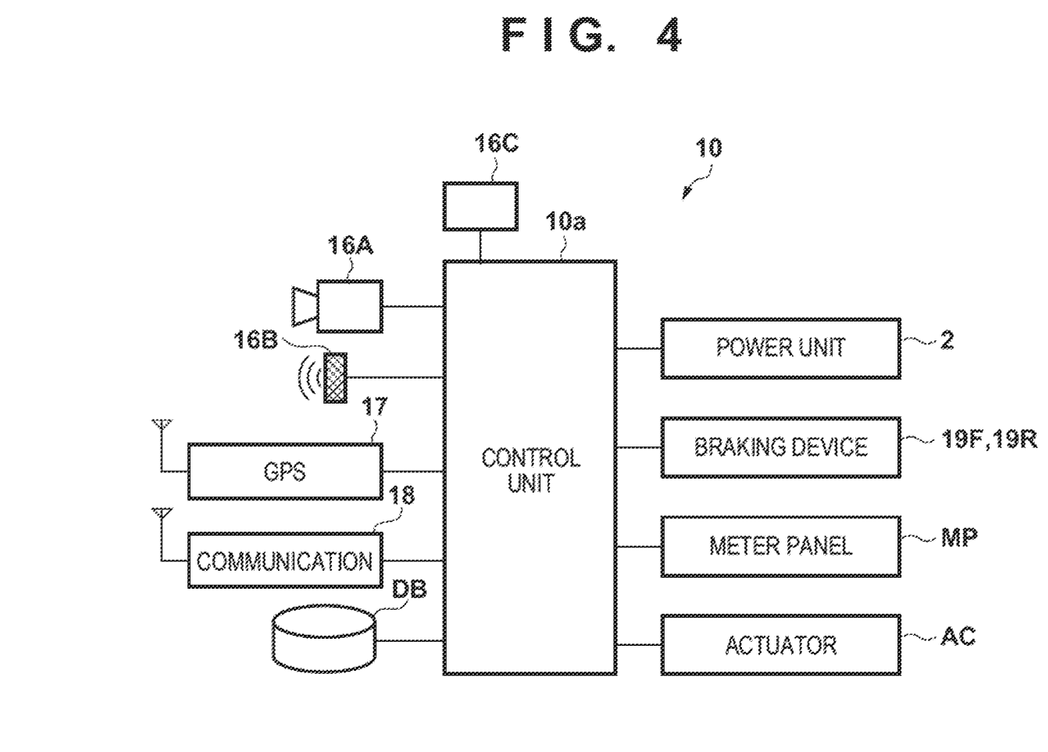
FIG. 4 is a block diagram illustrating a configuration of a control apparatus.

The saddle ride type vehicle 1 includes a control apparatus 10 for controlling each of the units (overall) of the saddle ride type vehicle 1. FIG. 4 is a block diagram illustrating a configuration of the control apparatus 10. The control apparatus 10 includes a control unit (ECU) 10a. A control unit 10a includes a processor as typified by a CPU, a storage device such as a semiconductor memory, an input/output interface or a communication interface with an external device. In the storage device, a program to be executed by the processor, data used for processing by the processor, and the like are stored. The control unit 10a may include a plurality of sets of a processor, a storage device, and an interface corresponding to each of the functions of the saddle ride type vehicle 1.

The control unit 10a acquires the result of sensing by the image capturing unit 16A and the radar 16B and constantly recognizes objects surrounding the saddle ride type vehicle 1 and the states of roads. Also, the control unit 10a acquires information from each of a GPS sensor 17, a communication apparatus 18, the map information database DB, and the measurement device 16C. The GPS sensor 17 senses the position (current position) of the saddle ride type vehicle 1. The communication apparatus 18 performs wireless communication with a server which provides map information and traffic information and acquires the information. Highly accurate map information is stored in the map information database DB. The control unit 10a can identify the form of the road currently being traveled and the position of the saddle ride type vehicle 1 in the travel lane more accurately based on the map information stored in the map information database DB.

The control unit 10a can control the actuator AC, the braking devices 19F and 19R (of the automatic control mechanism), and the power unit 2 which provide the driving force for the steering mechanism 60. The control unit 10a, in the present embodiment, in a case where a four-wheel vehicle that is present in front of the self-vehicle and is traveling in the travel lane of the self-vehicle is detected by the sensing devices including the image capturing unit 16A and the radar 16B, performs the follow-travel control for causing the traveling of the self-vehicle to follow the traveling of the four-wheel vehicle. At this time, the control unit 10a controls the actuator AC, the automatic braking mechanism of the braking devices 19F and 19R, and the power unit 2.

Hereinafter, the follow-travel control in the present embodiment will be described. The follow-travel control is a function provided to the driver as a driving support technique. When the sensing devices including the image capturing unit 16A and the radar 16B sense the four-wheel vehicle that is present in front of the self-vehicle (saddle ride type vehicle 1) and is traveling in the travel lane of the self-vehicle, that the follow-travel control can be performed is displayed on the meter panel MP, for example. Then, when the driver, for example, instructs to perform the follow-travel control via the meter panel MP, the control unit 10a starts the follow-travel control. Note that here, left-hand traffic is assumed as the rules of the road for vehicles. Also, each of the processing of the follow-travel control to be described below is periodically and repeatedly executed by the control unit 10a.

Figure 5:
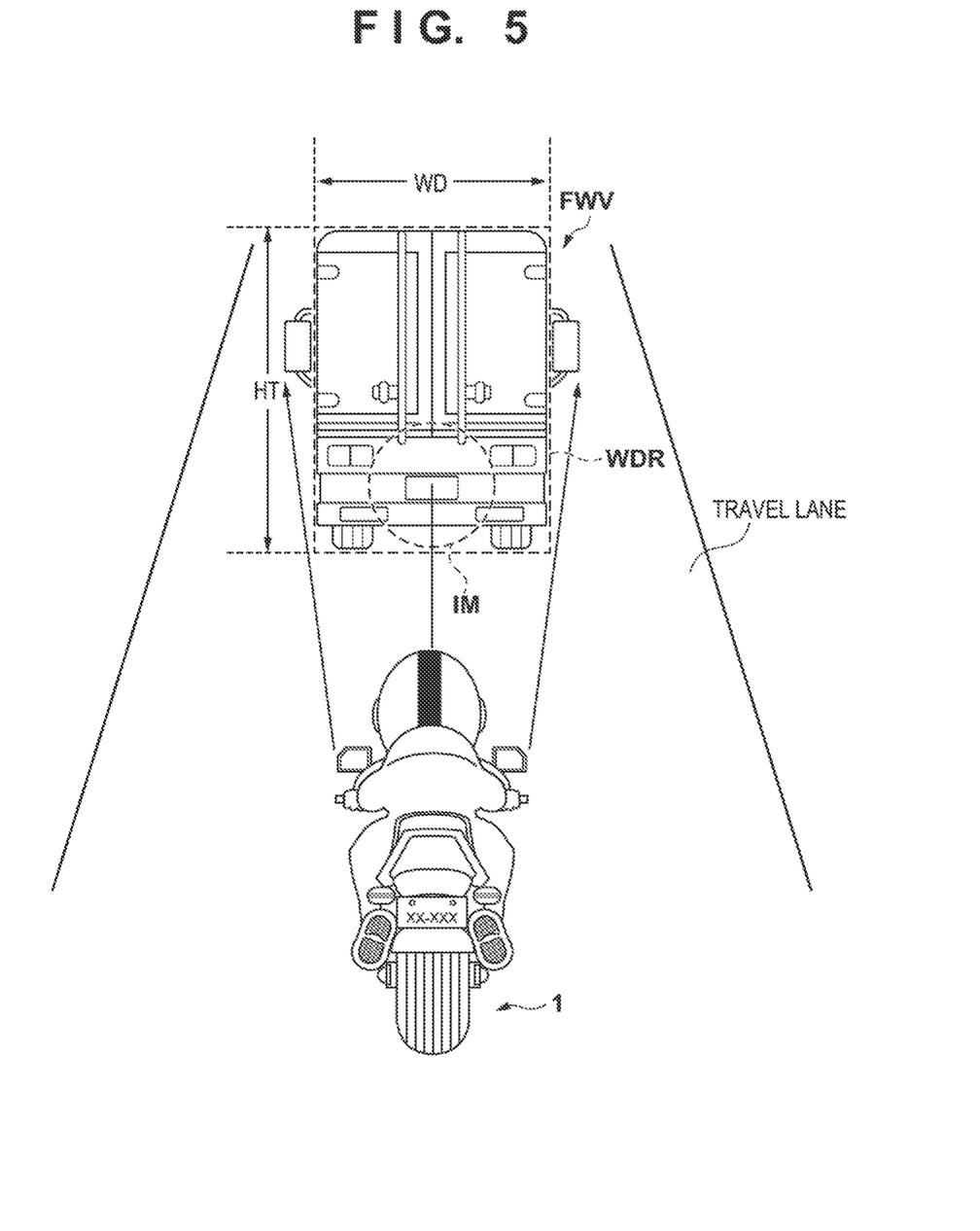
FIG. 5 is a view for describing follow-travel control in the present embodiment.

When the follow-travel control is started, the control unit 10a first controls the automatic braking mechanism of the braking devices 19F and 19R and the power unit 2 so as to follow a four-wheel vehicle FWV sensed by the sensing devices as illustrated in FIG. 5, specifically so that the travel speed of the self-vehicle (saddle ride type vehicle 1) is the same travel speed as the travel speed of the four-wheel vehicle FWV. Note that although the four-wheel vehicle FWV is a large-size vehicle such as a truck in FIG. 5, the present invention is not limited to this. For example, the four-wheel vehicle FWV may also be a standard-sized car such as a passenger car.

Next, a sensing device, for example, the image capturing unit 16A, senses a vehicle width WD of the four-wheel vehicle FWV from an image of the four-wheel vehicle FWV included in an image in front of the self-vehicle acquired by the image capturing unit 16A. Note that the vehicle width WD of the four-wheel vehicle FWV may be obtained by the control unit 10a based on the image acquired by the image capturing unit 16A. Here, the vehicle width of a vehicle is the length (width) in the left-and-right direction of the vehicle and generally is defined by a width of the vehicle from which side mirror units (movable portions) have been excluded. Accordingly, in the present embodiment, a width of the four-wheel vehicle FWV from which the side mirror units have been excluded is the vehicle width WD as illustrated in FIG. 5. However, a width in the left-and-right direction of the four-wheel vehicle FWV including the side mirror units may be defined as the vehicle width WD.

Next, the control unit 10a controls the travel position in the left-and-right direction (vehicle width direction) of the self-vehicle so that at least a portion of the self-vehicle such as the side mirror unit 15 falls within a region WDR within the vehicle width of the four-wheel vehicle FWV. In other words, the control unit 10a controls the travel position in the left-and-right direction of the self-vehicle so that at least a portion of an image IM of the self-vehicle that is formed when the self-vehicle is projected at 1×magnification in relation to the four-wheel vehicle FWV as illustrated in FIG. 5 is on the four-wheel vehicle FWV. The travel position in the left-and-right direction of the self-vehicle can be controlled by the control unit 10a controlling the actuator AC (steering the front wheel FW) which provides the driving force to the steering mechanism 60.

Accordingly, in the present embodiment, in the follow-travel control, the travel position in the left-and-right direction of the self-vehicle is controlled so that at least a portion of the self-vehicle (saddle ride type vehicle 1) falls within the region WDR within the vehicle width of the four-wheel vehicle FWV. By this, it becomes possible to avoid travelling on a road shoulder whose possibility that obstacles such as undulations are present is high, and travel on a road surface whose reliability of having been traveled on by the four-wheel vehicle FWV which is a preceding vehicle is relatively high. This is also advantageous in terms of steering control in the left-and-right direction (vehicle width direction) of the straddle type vehicle 1 in the follow-travel control.

Figure 6:
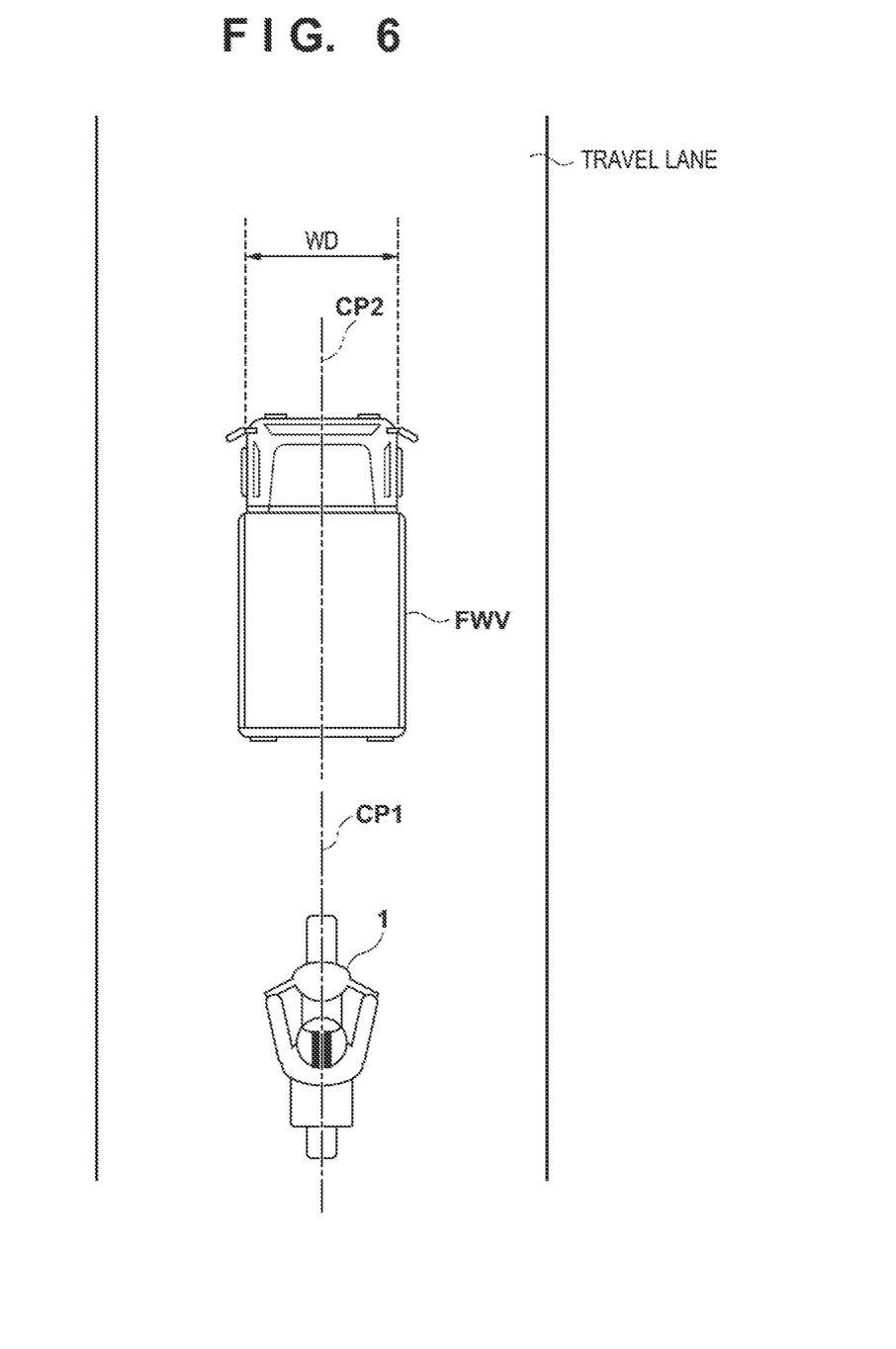
FIG. 6 is a view for describing follow-travel control in the present embodiment.

Also, in the follow-travel control of the present embodiment, basically, the travel position in the left-and-right direction (vehicle width direction) of the self-vehicle (saddle ride type vehicle 1) may be controlled so that a central portion CP1 in the left-and-right direction of the self-vehicle is brought closer to a central portion CP2 in the left-and-right direction of the four-wheel vehicle FWV as illustrated in FIG. 6, for example, so that the central portion CP1 of the self-vehicle is caused to be aligned with the central portion CP2 of the four-wheel vehicle FWV. By this, it becomes possible to make the sensing of the four-wheel vehicle FWV by the sensing unit easy (reliable), thereby reducing cases of losing the four-wheel vehicle FWV that is present in front of the self-vehicle, and enabling easy continuation of the follow-travel control (in other words, it becomes possible to avoid the disengagement of the follow-travel control).

Meanwhile, in a case where the four-wheel vehicle FWV that is present in front of the self-vehicle (saddle ride type vehicle 1) is a four-wheel vehicle such as a large-size vehicle whose vehicle height (height) is high, a forward field of view of the driver is blocked by the four-wheel vehicle FWV; therefore, it is not necessarily advantageous to control the travel position in the left-and-right direction of the self-vehicle so that the central portion CP1 in the left-and-right direction (vehicle width direction) of the self-vehicle is brought closer to the central portion CP2 in the left-and-right direction of the four-wheel vehicle FWV.

Figure 7:
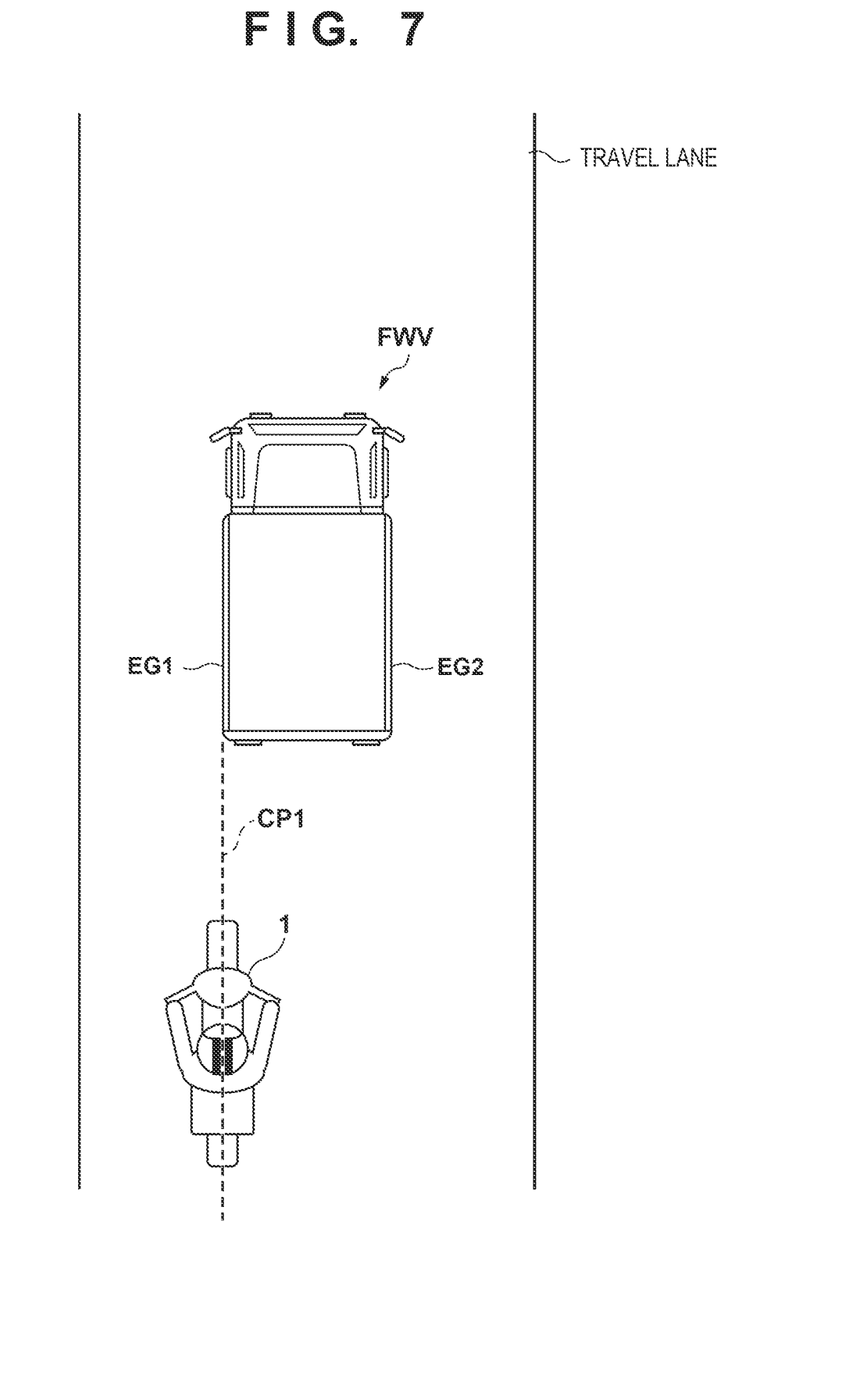
FIG. 7 is a view for describing follow-travel control in the present embodiment.

Accordingly, a sensing device, for example, the image capturing unit 16A, senses a height HT of the four-wheel vehicle in addition to sensing a vehicle width WD of the four-wheel vehicle FWV from an image of the four-wheel vehicle FWV included in an image in front of the self-vehicle (saddle ride type vehicle 1) acquired by the image capturing unit 16A. Note that the height HT of the four-wheel vehicle FWV may be obtained by the control unit 10a based on the image acquired by the image capturing unit 16A. Also, in a case where the height HT of the four-wheel vehicle FWV sensed by the sensing units is a predetermined height or more, the control unit 10a, as illustrated in FIG. 7, in the follow-travel control, controls the travel position in the vehicle width direction of the self-vehicle so that the central portion CP1 in the left-and-right direction (vehicle width direction) of the self-vehicle is brought closer to an edge portion EG1 or EG2 in the left-and-right direction of the four-wheel vehicle FWV, for example, so that the central portion CP1 of the self-vehicle is caused to be aligned with the edge portion EG1 or EG2 of the four-wheel vehicle FWV. By this, it becomes possible to ensure a forward field of view of the driver, and forward visibility can be improved. Also, by the forward visibility improving, the driver can predict (confirm in advance) sudden braking of the four-wheel vehicle FWV due to a situation in front of the four-wheel vehicle FWV (e.g., presence of an obstacle). Furthermore, the possibility that the self-vehicle appears in the side mirror units of the four-wheel vehicle FWV is increased, thereby enabling to improve the visibility of the self-vehicle from the four-wheel vehicle FWV (self-visibility). Note that the predetermined height may be set by default or may be enabled to be set as desired by the driver. When setting the predetermined height by default, a height at which a driver of an ordinary height in a posture in which he/she is sitting on the seat 4a of the straddle type vehicle 1 cannot be ensured a sufficient forward field of view if the four-wheel vehicle FWV is present in front may be set as a reference.

Also, in a case where the height HT of the four-wheel vehicle FWV sensed by the sensing units is lower than a predetermined height, the control unit 10a, as illustrated in FIG. 6, controls the travel position in the left-and-right direction of the self-vehicle so that the central portion CP1 in the left-and-right direction (vehicle width direction) of the self-vehicle (saddle ride type vehicle 1) is brought closer to the central portion CP2 in the left-and-right direction of the four-wheel vehicle FWV, for example, so that the central portion CP1 of the self-vehicle is caused to be aligned with the central portion CP2 of the four-wheel vehicle FWV.

Figure 8:
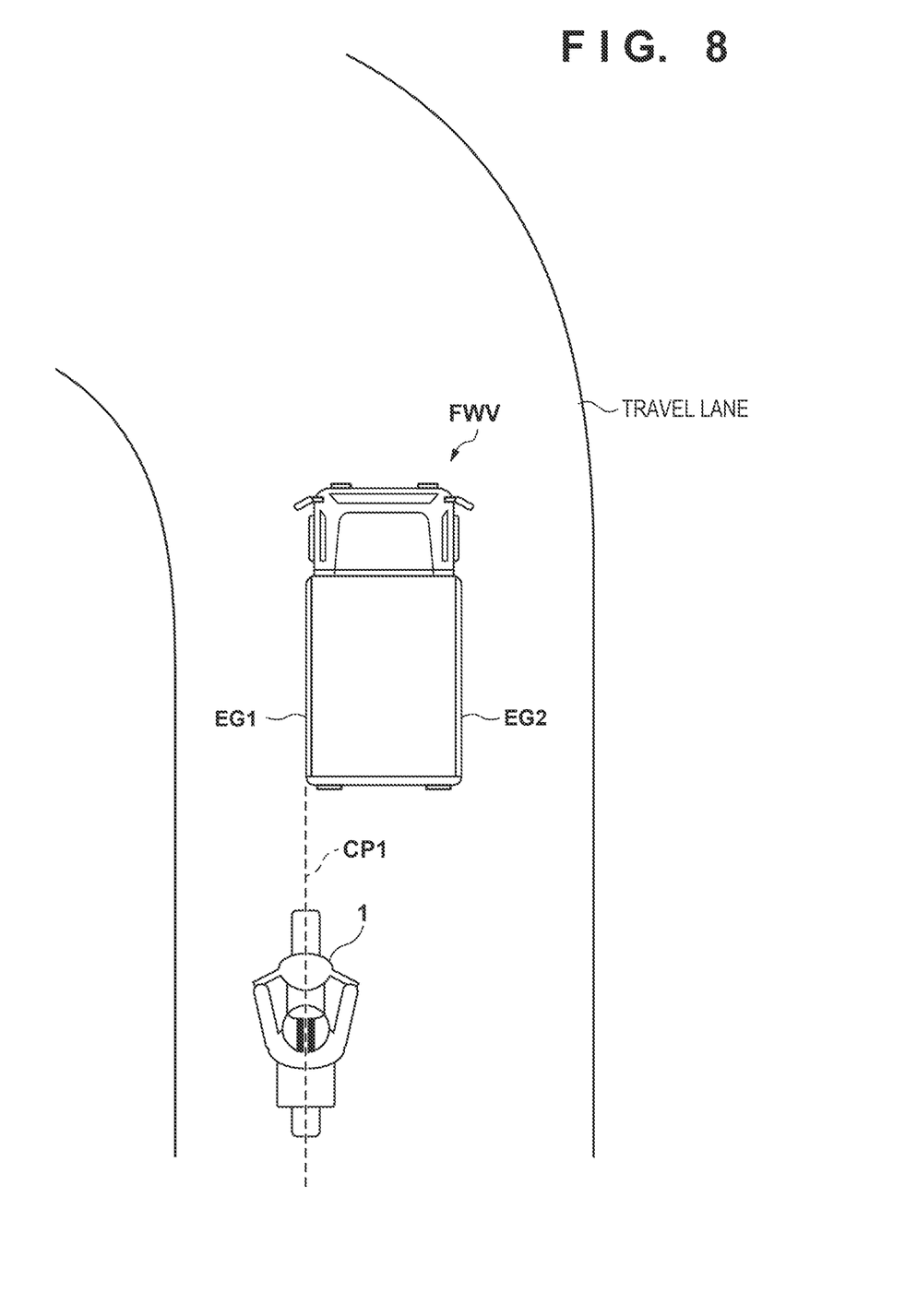
FIG. 8 is a view for describing follow-travel control in the present embodiment.

Also, as described above, the control unit 10a can identify the shape of the road on which the self-vehicle (saddle ride type vehicle 1) is traveling, specifically whether or not the travel lane of the self-vehicle is curved, based on the map information stored in the map information database DB. Accordingly, in a case where it is identified that the travel lane of the self-vehicle is curved, the control unit 10a, as illustrated in FIG. 8, in the follow-travel control, controls the travel position in the left-and-right direction (vehicle width direction) of the self-vehicle so that the central portion CP1 in the left-and-right direction of the self-vehicle is brought closer to the edge portion EG1 which is on a side in a direction to which the travel lane of the self-vehicle is curved among the two edge portions EG1 and EG2 in the left-and-right direction of the four-wheel vehicle FWV, for example, so that the central portion CP1 of the self-vehicle is caused to be aligned with the edge portion EG1 of the four-wheel vehicle FWV. In FIG. 8, the travel lane of the self-vehicle is curved in the left direction; therefore, the travel position in the left-and-right direction of the self-vehicle is controlled so that the central portion CP1 in the left-and-right direction of the self-vehicle is brought closer to the left edge portion EG1 of the four-wheel vehicle FWV. Note that, the travel lane of the self-vehicle is curved in the right direction; therefore, the travel position in the left-and-right direction of the self-vehicle is controlled so that the central portion CP1 in the left-and-right direction of the self-vehicle is brought closer to the right edge portion EG2 of the four-wheel vehicle FWV. By this, it becomes possible to ensure a forward field of view of the driver (the field of view of the direction in which the travel lane is curved), and forward visibility can be improved. Also, by the forward visibility improving, the driver can predict sudden braking of the four-wheel vehicle FWV due to a situation in front of the four-wheel vehicle FWV.

Note that in the present embodiment, it is identified whether or not the travel lane of the self-vehicle (saddle ride type vehicle 1) is curved based on the map information stored in the map information database DB; however, it is possible to identify whether or not the travel lane of the self-vehicle is curved based on other information such as position information of the self-vehicle, turning angle information of the self-vehicle, and bank angle information of the self-vehicle. In other words, whether or not the travel lane of the self-vehicle is curved may be identified based on at least one of the map information, the position information of the self-vehicle, the turning angle information of the self-vehicle, and the bank angle information of the self-vehicle. Here, the position information of the self-vehicle can be acquired from the GPS sensor 17, and the turning angle information and the bank angle information of the self-vehicle can be acquired from various sensors such as a velocity sensor which is generally provided on the saddle ride type vehicle 1, an acceleration sensor, a gyro sensor, and a sensor for detecting a drive operation (steering).

Figure 9:
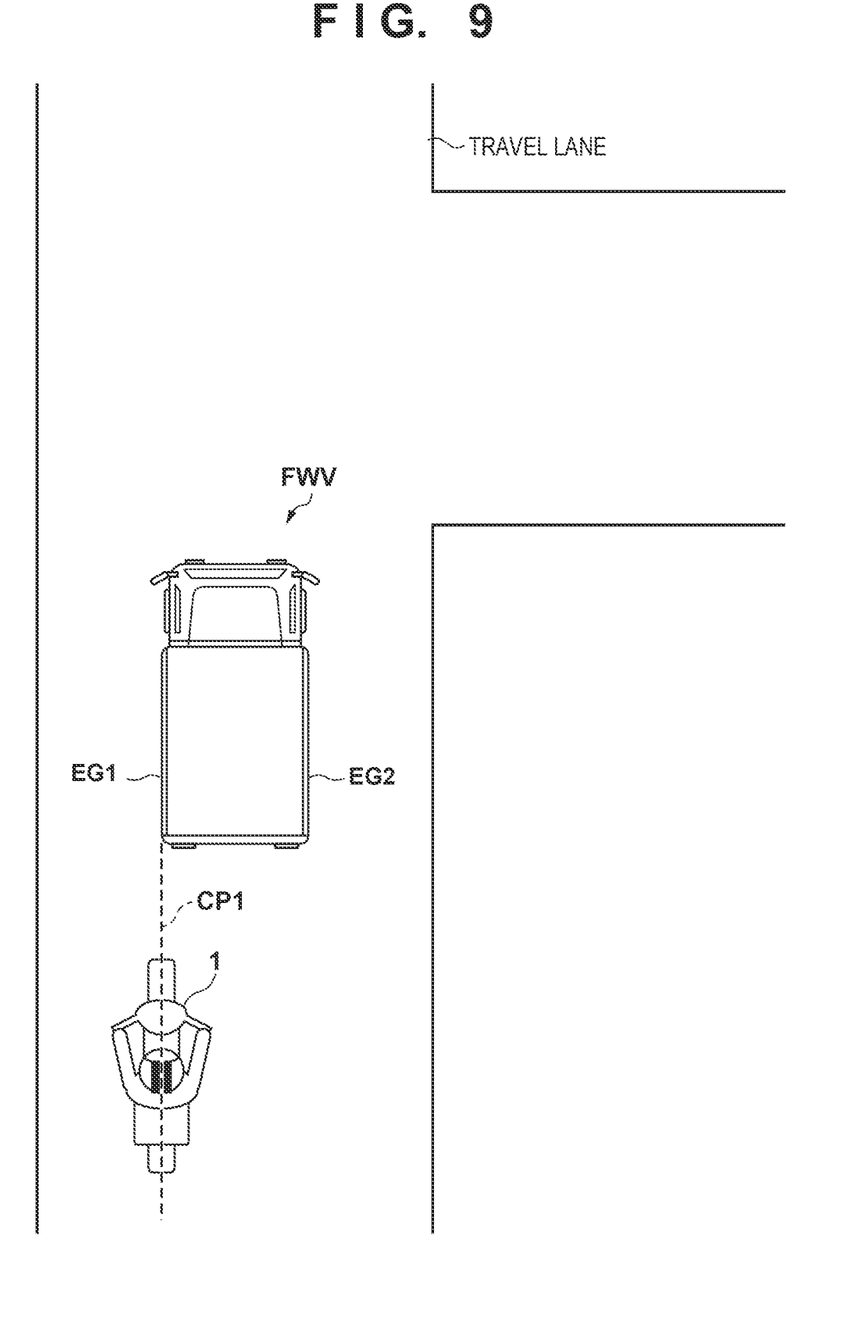
FIG. 9 is a view for describing follow-travel control in the present embodiment.

Also, as described above, the communication apparatus 18 is provided in the saddle ride type vehicle 1. The communication apparatus 18 can perform wireless communication not only with a server that provides map information and traffic information but also with vehicles (vehicle-to-vehicle communication) other than the self-vehicle such as the four-wheel vehicle FWV. Accordingly, the communication apparatus 18 can acquire right-or-left turn information of the four-wheel vehicle FWV, in other words, information indicating whether the four-wheel vehicle FWV will turn right or left via wireless communication with the four-wheel vehicle FWV. Then, in a case where the communication apparatus 18 acquires the right-or-left turn information of the four-wheel vehicle FWV, the control unit 10a, as illustrated in FIG. 9, in the follow-travel control, may control the travel position in the left-and-right direction (vehicle width direction) of the self-vehicle (saddle ride type vehicle 1) so that the central portion CP1 in the left-and-right direction of the self-vehicle is brought closer to the edge portion EG1 on a side in a direction that is different from a direction indicated by the right-or-left turn information among the two edge portions EG1 and EG2 in the left-and-right direction of the four-wheel vehicle FWV, for example, so that the central portion CP1 of the self-vehicle is caused to be aligned with the edge portion EG1 of the four-wheel vehicle FWV. Note that in FIG. 9, the right-or-left turn information of the four-wheel vehicle FWV indicates to turn right; therefore, the travel position in the left-and-right direction of the self-vehicle is controlled so that the central portion CP1 in the left-and-right direction of the self-vehicle is brought closer to the left edge portion EG1 of the four-wheel vehicle FWV. Note that the right-or-left turn information of the four-wheel vehicle FWV indicates to turn left; therefore, the travel position in the left-and-right direction of the self-vehicle is controlled so that the central portion CP1 in the left-and-right direction of the self-vehicle is brought closer to the right edge portion EG2 of the four-wheel vehicle FWV. By this, it becomes possible to reduce the possibility that a turn accident of the self-vehicle due to the four-wheel vehicle FWV turning right or left will occur (in other words, it becomes possible to avoid turn accidents).

Also, in the follow-travel control in the present embodiment, the travel position in the left-and-right direction (vehicle width direction) of the self-vehicle (saddle ride type vehicle 1) may be controlled in accordance with the travel speed of the self-vehicle, in other words, whether the self-vehicle is traveling at a low speed or a high speed. The control unit 10a can acquire the travel speed from the velocity sensor provided in the straddle type vehicle 1. Accordingly, in a case where the travel speed of the self-vehicle is a predetermined speed or less, for example, in a case where it is 30 km/h or less, the control unit 10a, as illustrated in FIG. 7, in the follow-travel control, controls the travel position in the left-and-right direction of the self-vehicle so that the central portion CP1 in the left-and-right direction of the self-vehicle is brought closer to the edge portion EG1 or EG 2 in the left-and-right direction of the four-wheel vehicle FWV, for example, so that the central portion CP1 of the self-vehicle is caused to be aligned with the edge portion EG1 or EG2 of the four-wheel vehicle FWV. By this, it becomes possible to improve visibility and self-visibility when traveling at a low speed at which the following distance tends to be shorter. Meanwhile, in a case where the travel speed of the self-vehicle is faster than a predetermined speed, for example, in a case where it is more than 30 km/h, the control unit 10a, as illustrated in FIG. 6, in the follow-travel control, controls the travel position in the left-and-right direction of the self-vehicle so that the central portion CP1 in the left-and-right direction of the self-vehicle is brought closer to the central portion CP2 in the left-and-right direction of the four-wheel vehicle FWV, and prioritizes making continuation of the follow-travel control easier.

Also, as described above, the measurement device 16C for measuring the pressure of wind that the self-vehicle receives while traveling is provided in the saddle ride type vehicle 1. Accordingly, in a case where a wind pressure measured by the measurement device 16C is a predetermined wind pressure or more, the control unit 10a, as illustrated in FIG. 7, in the follow-travel control, controls the travel position in the left-and-right direction of the self-vehicle so that the central portion CP1 in the left-and-right direction of the self-vehicle is brought closer to the central portion CP2 in the left-and-right direction of the four-wheel vehicle FWV, for example, the central portion CP1 of the self-vehicle is caused to be aligned with the central portion CP2 of the four-wheel vehicle FWV, in order to prioritize easy continuation of the follow-travel control.

Note that in the present embodiment, it was described that when the travel position in the left-and-right direction of the self-vehicle is controlled in the follow-travel control, the actuator AC for providing the driving force to the steering mechanism 60 is controlled (the front wheel FW is steered). However, it goes without saying that the automatic braking mechanism of the braking devices 19F and 19R and the power unit 2 are controlled as necessary in addition to the control of the actuator AC.

A saddle ride type vehicle as a first embodiment of the present invention includes: a sensing unit configured to sense a four-wheel vehicle that is present in front of a self-vehicle and is traveling in a travel lane of the self-vehicle; and a control unit configured to, in a case where the four-wheel vehicle is sensed by the sensing unit, perform follow-travel control for causing traveling of the self-vehicle to follow traveling of the four-wheel vehicle, wherein the sensing unit senses a vehicle width of the four-wheel vehicle, and the control unit, in the follow-travel control, controls a travel position in a vehicle width direction of the self-vehicle so that at least a portion of the self-vehicle falls within a region within the vehicle width of the four-wheel vehicle.

By virtue of the first embodiment of the present invention, it becomes possible to travel on a relatively high reliability road surface that the four-wheel vehicle which is a preceding vehicle has traveled over.

In a saddle ride type vehicle as a second embodiment of the present invention, the control unit, in the follow-travel control, controls the travel position in the vehicle width direction of the self-vehicle so that a central portion in the vehicle width direction of the self-vehicle is brought closer to a central portion in a vehicle width direction of the four-wheel vehicle.

By virtue of the second embodiment of the present invention, it becomes possible to cause the follow-travel control to be easily continued.

In a saddle ride type vehicle as a third embodiment of the present invention, the sensing unit senses a height of the four-wheel vehicle and in a case where the height of the four-wheel vehicle sensed by the sensing unit is a predetermined height or more, the control unit, in the follow-travel control, controls the travel position in the vehicle width direction of the self-vehicle so that the central portion in the vehicle width direction of the self-vehicle is brought closer to an edge portion in the vehicle width direction of the four-wheel vehicle.

By virtue of the third embodiment of the present invention, it becomes possible to improve forward visibility, predict sudden braking of the four-wheel vehicle FWV, and improve self-visibility.

In a saddle ride type vehicle as a fourth embodiment of the present invention, wherein in a case where the height of the four-wheel vehicle sensed by the sensing unit is less than the predetermined height, the control unit, in the follow-travel control, controls the travel position in the vehicle width direction of the self-vehicle so that the central portion in the vehicle width direction of the self-vehicle is brought closer to the central portion in the vehicle width direction of the four-wheel vehicle.

By virtue of the fourth embodiment of the present invention, it becomes possible to cause the follow-travel control to be easily continued.

A saddle ride type vehicle as a fifth embodiment of the present invention further includes an identification unit configured to identify whether or not the travel lane of the self-vehicle is curved, wherein in a case where the travel lane of the self-vehicle is identified to be curved by the identification unit, the control unit, in the follow-travel control, controls the travel position in the vehicle width direction of the self-vehicle so that the central portion in the vehicle width direction of the self-vehicle is brought closer to an edge portion on a side in a direction to which the travel lane of the self-vehicle is curved among two edge portions in the vehicle width direction of the four-wheel vehicle.

By virtue of the fifth embodiment of the present invention, it becomes possible to improve forward visibility and predict sudden braking of the four-wheel vehicle.

In a saddle ride type vehicle as a sixth embodiment of the present invention, the identification unit identifies whether or not the travel lane of the self-vehicle is curved based on at least one of position information of the self-vehicle, turning angle information of the self-vehicle, bank angle information of the self-vehicle, and map information.

By virtue of the sixth embodiment of the present invention, it becomes possible to accurately identify whether or not the travel lane of the self-vehicle is curved.

A saddle ride type vehicle as a seventh embodiment of the present invention further includes a communication unit configured to communicate with the four-wheel vehicle, wherein a communication means acquires right-or-left turn information of the four-wheel vehicle by communicating with the four-wheel vehicle, and the control unit, in the follow-travel control, controls the travel position in the vehicle width direction of the self-vehicle so that the central portion in the vehicle width direction of the self-vehicle is brought closer to an edge portion on a side in a direction that is different from a direction that is indicated by the right-or-left turn information among the two edge portions in the vehicle width direction of the four-wheel vehicle.

By virtue of the seventh embodiment of the present invention, it becomes possible to reduce the possibility that a turn accident of the self-vehicle due to the four-wheel vehicle right or left may occur.

The saddle ride type vehicle as an eighth embodiment of the present invention further includes an acquisition unit configured to acquire a travel speed of the self-vehicle, wherein in a case where the travel speed of the self-vehicle acquired by the acquisition unit is a predetermined speed or less, the control unit, in the follow-travel control, controls the travel position in the vehicle width direction of the self-vehicle so that the central portion in the vehicle width direction of the self-vehicle is brought closer to an edge portion in the vehicle width direction of the four-wheel vehicle.

By virtue of the eighth embodiment of the present invention, it becomes possible to improve forward visibility and self-visibility.

In a saddle ride type vehicle as ninth embodiment of the present invention, the travel speed of the self-vehicle acquired by the acquisition unit is faster than the predetermined speed, the control unit, in the follow-travel control, controls the travel position in the vehicle width direction of the self-vehicle so that the central portion in the vehicle width direction of the self-vehicle is brought closer to the central portion in the vehicle width direction of the four-wheel vehicle.

By virtue of the ninth embodiment of the present invention, it becomes possible to easily continue the follow-travel control.

A saddle ride type vehicle as a tenth embodiment of the present invention further includes a measuring unit configured to measure a pressure of wind that the self-vehicle receives while traveling, wherein in a case where the pressure of wind measured by the measuring unit is a predetermined pressure of wind or more, the control unit, in the follow-travel control, controls the travel position in the vehicle width direction of the self-vehicle so that the central portion in the vehicle width direction of the self-vehicle is brought closer to the central portion in the vehicle width direction of the four-wheel vehicle.

By virtue of the tenth embodiment of the present invention, it becomes possible to cause the follow-travel control to be easily continued.

A control apparatus of a saddle ride type vehicle as an eleventh embodiment of the present invention includes a sensing unit configured to sense a four-wheel vehicle that is present in front of a self-vehicle and is traveling in a travel lane of the self-vehicle; and a control unit configured to, in a case where the four-wheel vehicle is sensed by the sensing unit, perform follow-travel control for causing traveling of the self-vehicle to follow traveling of the four-wheel vehicle, wherein the sensing unit senses a vehicle width of the four-wheel vehicle, and the control unit, in the follow-travel control, controls a travel position in a vehicle width direction of the self-vehicle so that at least a portion of the self-vehicle falls within a region within the vehicle width of the four-wheel vehicle.

By virtue of the eleventh embodiment of the present invention, it becomes possible to travel on a relatively high reliability road surface that the four-wheel vehicle which is a preceding vehicle has traveled over.

The invention is not limited to the foregoing embodiments, and various variations/changes are possible within the spirit of the invention.

What is claimed is:

1. A saddle ride type vehicle comprising:
   a sensing unit configured to sense a four-wheel vehicle that is present in front of the saddle ride type vehicle and is traveling in a travel lane of the saddle ride type vehicle; and
   a control unit configured to, when the four-wheel vehicle is sensed by the sensing unit, perform follow-travel control for causing traveling of the saddle ride type vehicle to follow traveling of the four-wheel vehicle, wherein
   the sensing unit senses a vehicle width of the four-wheel vehicle, and
   the control unit, in the follow-travel control, controls a travel position in a vehicle width direction of the saddle ride type vehicle so that at least a portion of the saddle ride type vehicle falls within a region within the vehicle width of the four-wheel vehicle and a central portion in the vehicle width direction of the saddle ride type vehicle is brought closer to a central portion in a vehicle width direction of the four-wheel vehicle,
   wherein the sensing unit senses a height of the four-wheel vehicle and
   when the height of the four-wheel vehicle sensed by the sensing unit is a predetermined height or more, the control unit, in the follow-travel control, controls the travel position in the vehicle width direction of the saddle ride type vehicle so that the central portion in the vehicle width direction of the saddle ride type vehicle is brought closer to an edge portion in the vehicle width direction of the four-wheel vehicle,
   wherein when the height of the four-wheel vehicle sensed by the sensing unit is less than the predetermined height, the control unit, in the follow-travel control, controls the travel position in the vehicle width direction of the saddle ride type vehicle so that the central portion in the vehicle width direction of the saddle ride type vehicle is brought closer to the central portion in the vehicle width direction of the four-wheel vehicle.

2. The saddle ride type vehicle according to claim 1, wherein the control unit is configured to identify whether or not the travel lane of the saddle ride type vehicle is curved, wherein when the travel lane of the saddle ride type vehicle is identified to be curved, the control unit, in the follow-travel control, controls the travel position in the vehicle width direction of the saddle ride type vehicle so that the central portion in the vehicle width direction of the saddle ride type vehicle is brought closer to an edge portion on a side in a direction to which the travel lane of the saddle ride type vehicle is curved among two edge portions in the vehicle width direction of the four-wheel vehicle.

3. The saddle ride type vehicle according to claim 2, wherein the control unit identifies whether or not the travel lane of the saddle ride type vehicle is curved based on at least one of position information of the saddle ride type vehicle, turning angle information of the saddle ride type vehicle, bank angle information of the saddle ride type vehicle, and map information.

4. The saddle ride type vehicle according to claim 1, further comprising a communication apparatus configured to communicate with the four-wheel vehicle,
   wherein the communication apparatus acquires right-or-left turn information of the four-wheel vehicle by communicating with the four-wheel vehicle, and
   the control unit, in the follow-travel control, controls the travel position in the vehicle width direction of the saddle ride type vehicle so that the central portion in the vehicle width direction of the saddle ride type vehicle is brought closer to an edge portion on a side in a direction that is different from a direction that is indicated by the right-or-left turn information among two edge portions in the vehicle width direction of the four-wheel vehicle.

5. The saddle ride type vehicle according to claim 1, further comprising a velocity sensor configured to acquire a travel speed of the saddle ride type vehicle,
   wherein when the travel speed of the saddle ride type vehicle acquired by the velocity sensor is a predetermined speed or less, the control unit, in the follow-travel control, controls the travel position in the vehicle width direction of the saddle ride type vehicle so that the central portion in the vehicle width direction of the saddle ride type vehicle is brought closer to an edge portion in the vehicle width direction of the four-wheel vehicle.

6. The saddle ride type vehicle according to claim 5, wherein, when the travel speed of the saddle ride type vehicle acquired by the velocity sensor is faster than the predetermined speed, the control unit, in the follow-travel control, controls the travel position in the vehicle width direction of the saddle ride type vehicle so that the central portion in the vehicle width direction of the saddle ride type vehicle is brought closer to the central portion in the vehicle width direction of the four-wheel vehicle.

7. The saddle ride type vehicle according to claim 1, further comprising a measuring device configured to measure a pressure of wind that the saddle ride type vehicle receives while traveling,
   wherein when the pressure of wind measured by the measuring device is a predetermined pressure of wind or more, the control unit, in the follow-travel control, controls the travel position in the vehicle width direction of the saddle ride type vehicle so that the central portion in the vehicle width direction of the saddle ride type vehicle is brought closer to the central portion in the vehicle width direction of the four-wheel vehicle.

8. A control apparatus of a saddle ride type vehicle, the apparatus comprising:

a sensing unit configured to sense a four-wheel vehicle that is present in front of the saddle ride type vehicle and is traveling in a travel lane of the saddle ride type vehicle; and a control unit configured to, when the four-wheel vehicle is sensed by the sensing unit, perform follow-travel control for causing traveling of the saddle ride type vehicle to follow traveling of the four-wheel vehicle, wherein the sensing unit senses a vehicle width of the four-wheel vehicle, and the control unit, in the follow-travel control, controls a travel position in a vehicle width direction of the saddle ride type vehicle so that at least a portion of the saddle ride type vehicle falls within a region within the vehicle width of the four-wheel vehicle and a central portion in the vehicle width direction of the saddle ride type vehicle is brought closer to a central portion in a vehicle width direction of the four-wheel vehicle, wherein the sensing unit senses a height of the four-wheel vehicle and when the height of the four-wheel vehicle sensed by the sensing unit is a predetermined height or more, the control unit, in the follow-travel control, controls the travel position in the vehicle width direction of the saddle ride type vehicle so that the central portion in the vehicle width direction of the saddle ride type vehicle is brought closer to an edge portion in the vehicle width direction of the four-wheel vehicle, wherein when the height of the four-wheel vehicle sensed by the sensing unit is less than the predetermined height, the control unit, in the follow-travel control, controls the travel position in the vehicle width direction of the saddle ride type vehicle so that the central portion in the vehicle width direction of the saddle ride type vehicle is brought closer to the central portion in the vehicle width direction of the four-wheel vehicle.

* * * * *